April 29, 1947. L. I. YEOMANS ET AL 2,419,868
MACHINE TOOL
Original Filed Sept. 24, 1943 5 Sheets-Sheet 1

Inventors
Lucien I. Yeomans
Raymond P. Frye
By Carlson, Pitzner, Hubbard & Wolfe
ATTORNEYS

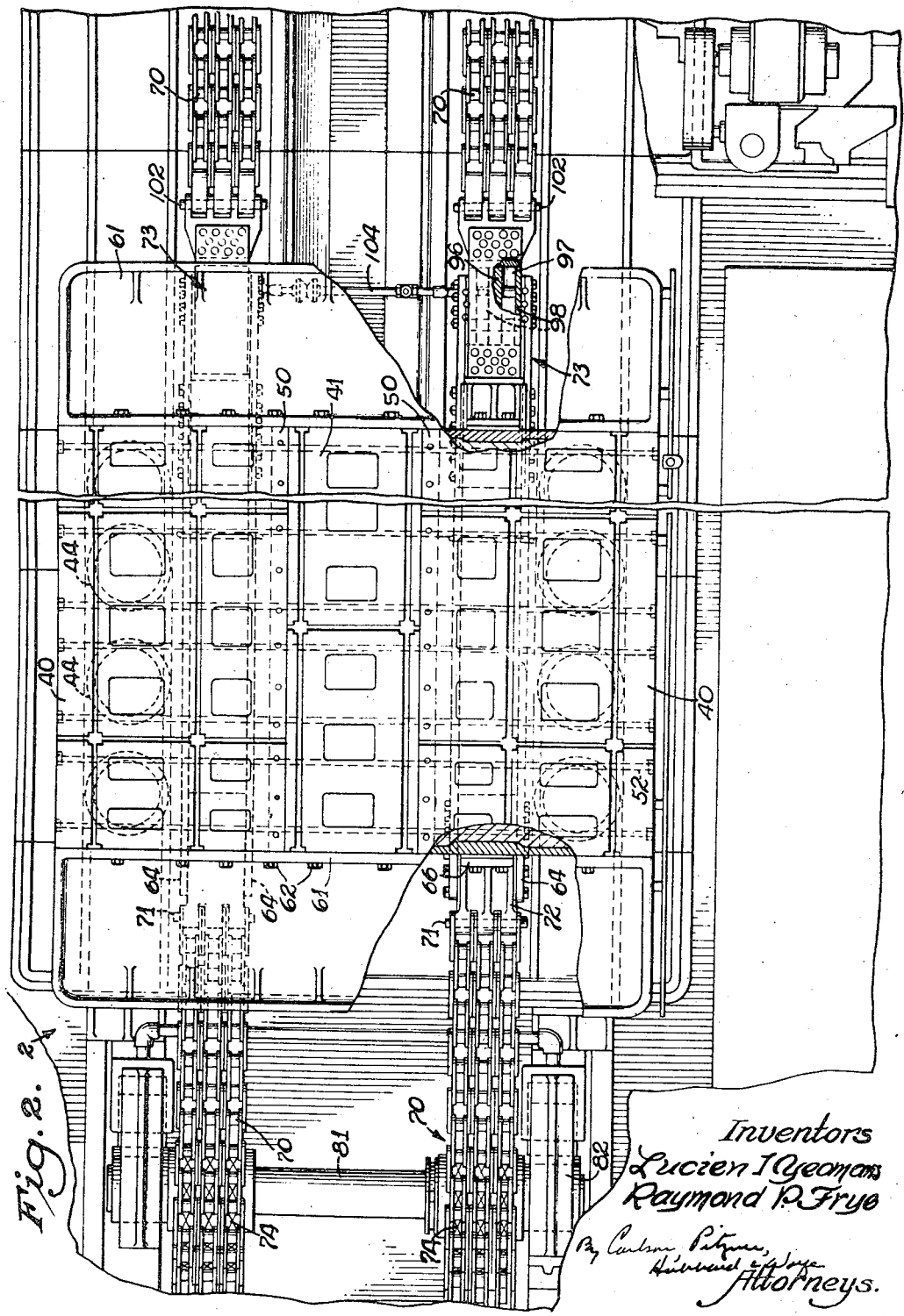

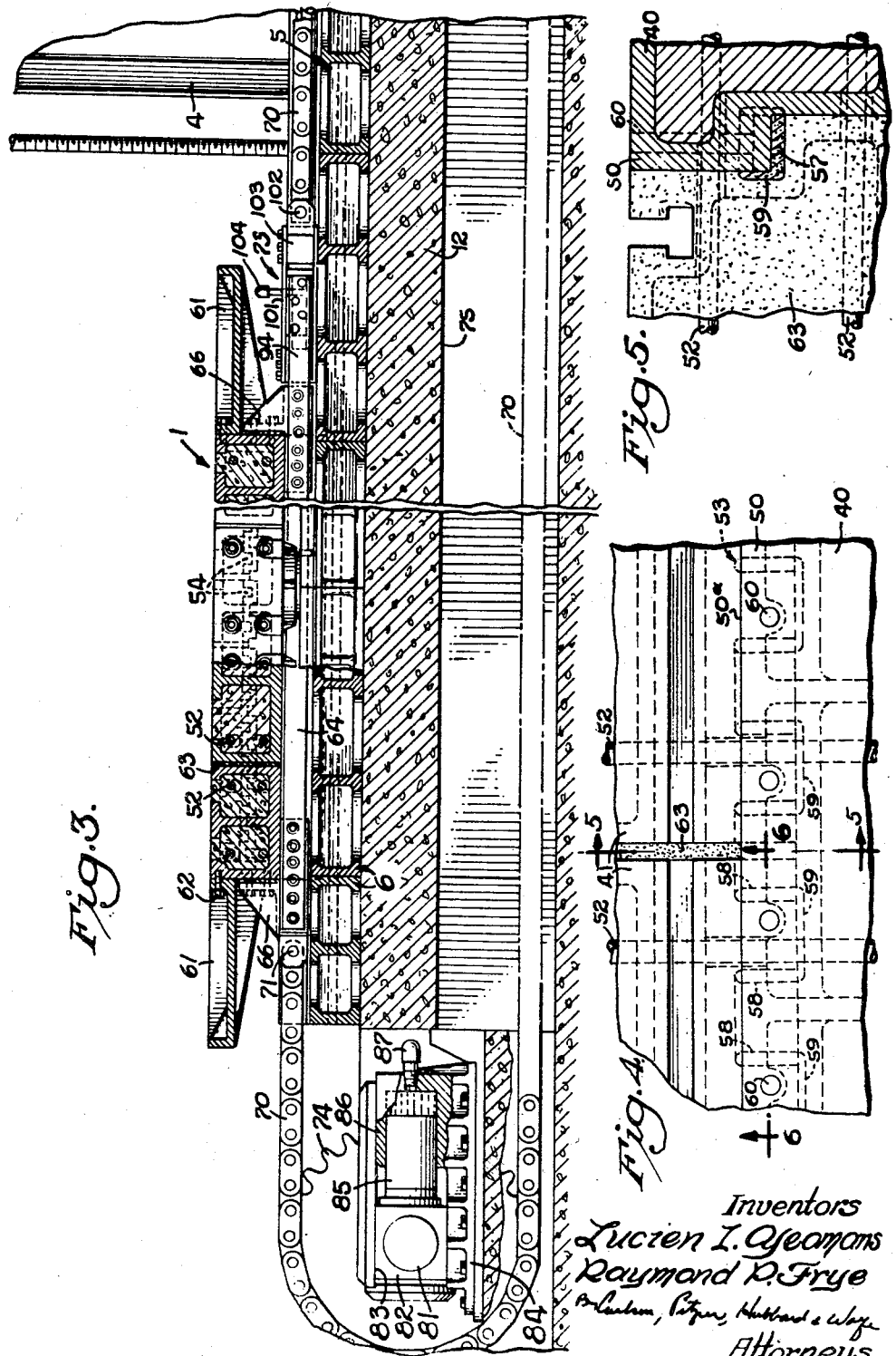

April 29, 1947.　　L. I. YEOMANS ET AL　　2,419,868
MACHINE TOOL
Original Filed Sept. 24, 1943　　5 Sheets-Sheet 4
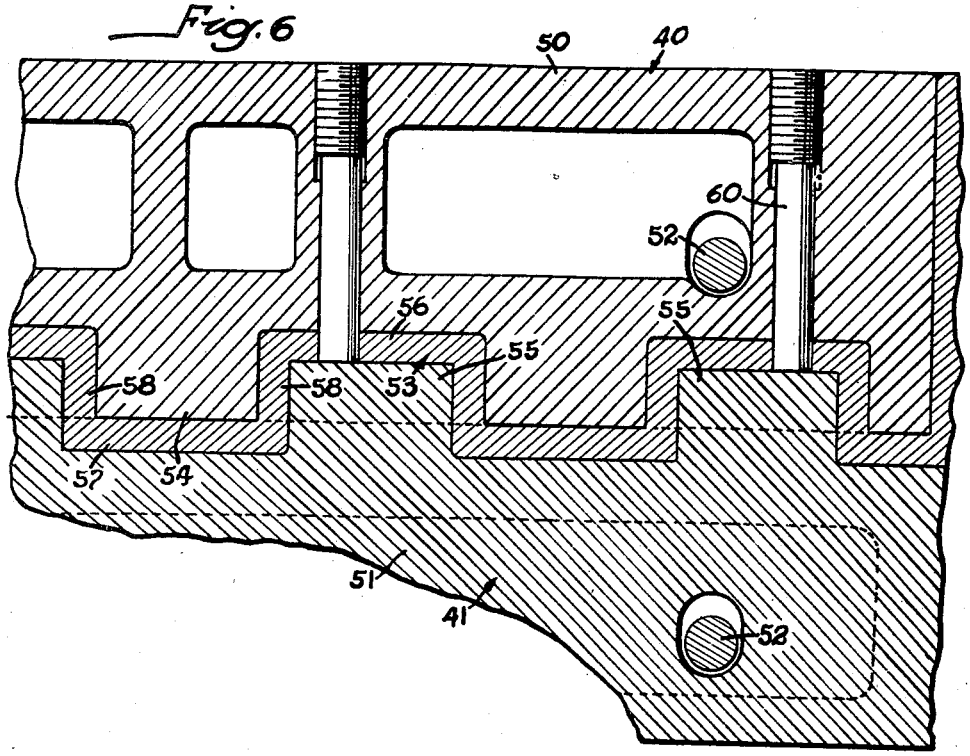
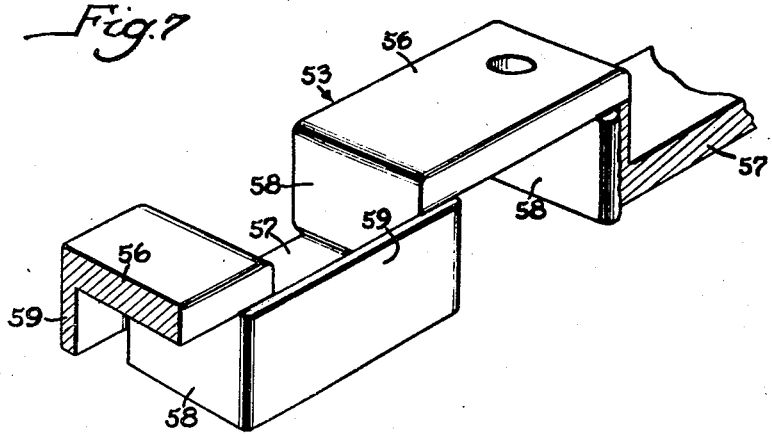
INVENTORS
Lucien I. Yeomans
Raymond D. Frye
ATTORNEYS April 29, 1947.  L. I. YEOMANS ET AL  2,419,868
MACHINE TOOL
Original Filed Sept. 24, 1943   5 Sheets-Sheet 5
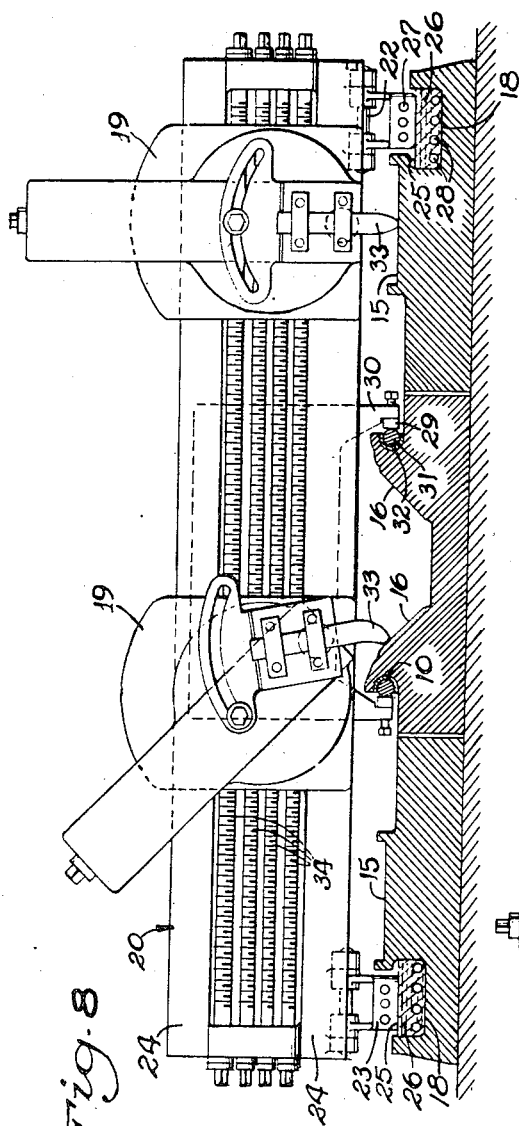
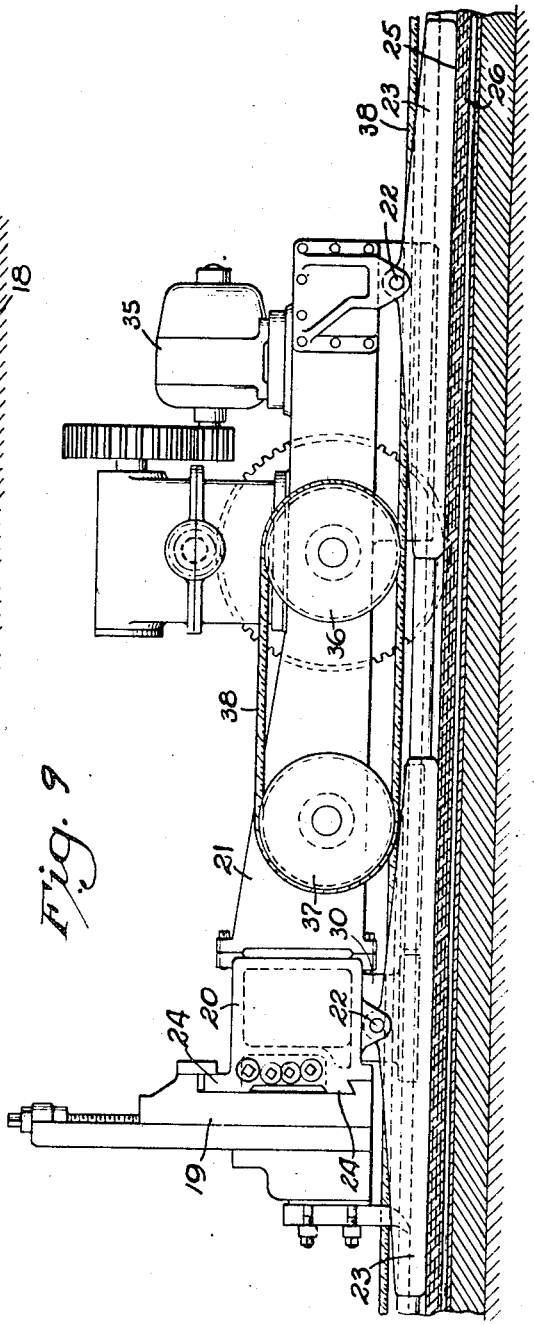
Inventors
Lucien I. Yeomans
Raymond D. Frye
By Carlson, Pitzner, Hubbard & Wolfe
Attorneys.

Patented Apr. 29, 1947

2,419,868

UNITED STATES PATENT OFFICE 2,419,868

MACHINE TOOL

Lucien I. Yeomans and Raymond P. Frye, Chicago, Ill., assignors to Lucien I. Yeomans, Inc., Chicago, Ill., a corporation of Illinois Original application September 24, 1943, Serial No. 503,630. Divided and this application July 12, 1945, Serial No. 604,552

3 Claims. (Cl. 90—34)

1

The present application is a division of our copending application Serial No. 503,630, filed September 24, 1943.

The present invention pertains to machine tools, such as planers and milling machines having long work supporting tables which are arranged for longitudinal reciprocation.

The general object or aim of the present invention is to afford a novel and improved bed and table guide arrangement for machine tools of the character indicated.

More particularly, it is an object to provide such an arrangement for guiding and supporting a sectional table, the whole being of such character as to make possible the erection of machines of even huge size at the point of use.

Further objects and advantages of the invention will become apparent as the following description proceeds, taken in connection with the accompanying drawings in which:

Fig. 2 is a fragmentary plan view of the table.

Fig. 3 is a partial section taken along the line 3—3 of Fig. 1.

Fig. 4 is an enlarged view of a portion of Fig. 2.

Figure 1:
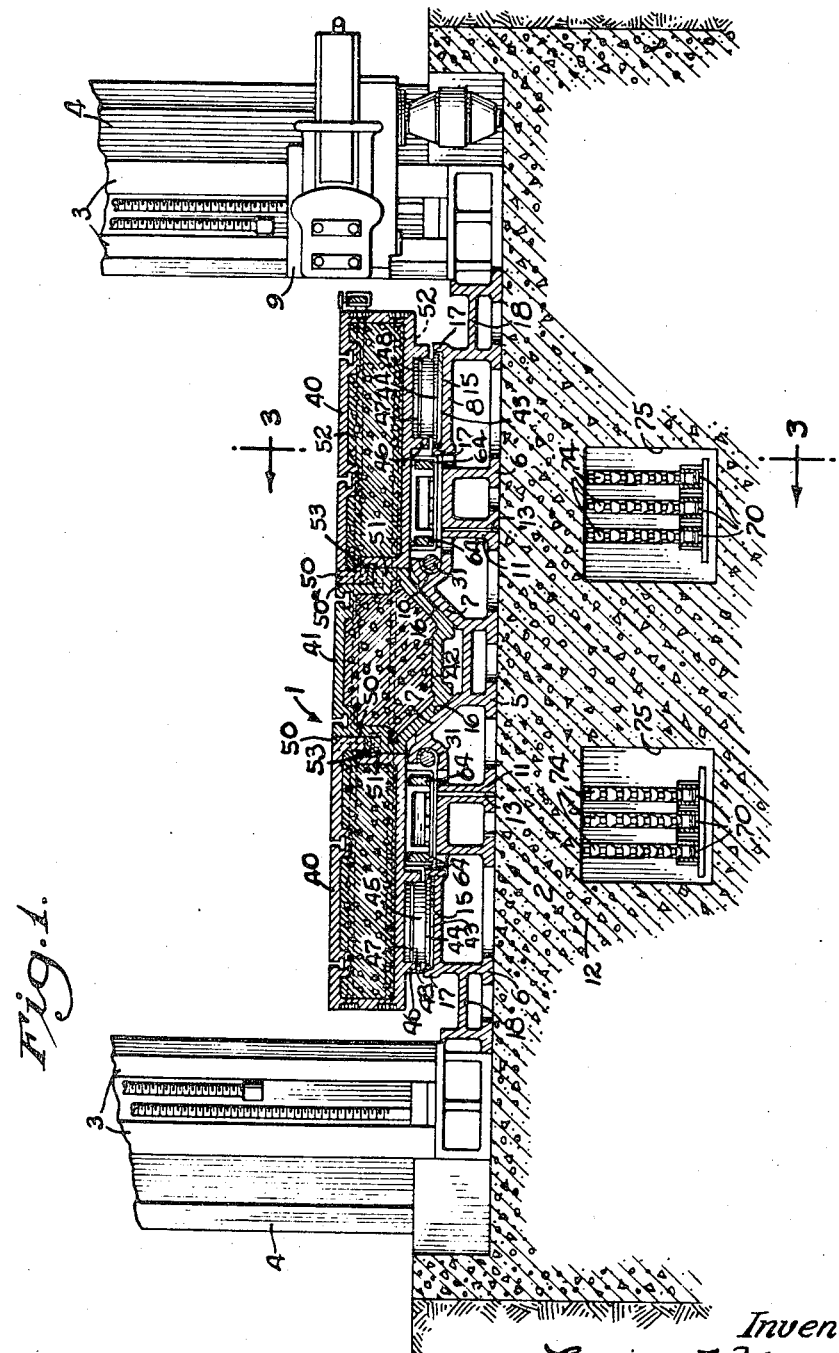
Figure 1 is a fragmentary transverse sectional view of the table and tool supporting columns of a machine tool embodying the novel features of the present invention.

Figs. 5 and 6 are fragmentary sectional views taken along the lines 5—5 and 6—6 respectively of Fig. 4.

Fig. 7 is a fragmentary perspective view of a key for locking the table sections together.

Fig. 8 is a front elevational view of the set-up for machining the table ways.

Fig. 9 is a side view of the mechanism shown in Fig. 8.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

In the drawings, the invention is embodied for purposes of illustration in the table 1 and the supporting bed structure 2 of a planer or milling machine, the table being of substantial size and having a long range of longitudinal reciprocation. The top of the table is T-slotted in the usual way to permit the clamping thereto of workpieces which are machined by tools mounted in heads 9 which are fed vertically along ways 3 on columns 4 or along a crossrail in the case of certain types of milling machines.

To facilitate shipment and final assembly without material machining of the parts, the bed 2 is divided both laterally and longitudinally of the direction of table travel into separate sections 5 and 6 in the form of hollow castings ribbed both laterally and longitudinally. The center or intermediate sections 5 are arranged end to end and are cast with a top wall 7 having laterally spaced downwardly converging portions. Outwardly opening grooves 10 of generally semi-circular cross-section are cast in the section 5, these grooves being spaced inwardly from the vertical side walls 11 of the section. The sections 6 are arranged end to end along the sides 11 of the intermediate sections 5 just out of edgewise abutment with the latter and out of longitudinal abutment with each other. Each has a generally flat-top wall formed with laterally spaced upstanding ribs 17 intermediate its sides. Along the outer side is a depressed portion 18 which aligns with the corresponding portions of the row of sections 6 to form a trough extending the full length of the bed.

The rigid bed structure 2 is formed at the location where the machine tool is ultimately to be used, and this without preliminary machining of the surfaces of the castings 5 and 6 prior to their assembly and anchorage to the foundation 12 at said ultimate location. To form the bed, two side rows of the sections 6 and one intermediate row of the sections 5 are arranged on the foundation and grouted in place with their rough sides and ends separated by narrow gaps 13 so as to avoid interference between the roughly cast surfaces. The gaps between the side sections 6 in each row are filled so that the trough formed by depressed portions 18 is capable of retaining a liquid.

After such final and rigid assembly of the bed sections, two horizontal surfaces 15 and two converging surfaces 16 are machined on the sections 5 and 6, respectively, throughout the length of the bed. These support the side and intermediate portions of the table for longitudinal reciprocation of the latter, the surfaces 16 also serving to guide the table laterally. Formation of these surfaces with the required precision may be effected by the temporary tool set-up shown in Figs. 8 and 9. In this, tool heads 19, which may be the ones to be used in the final machine tool assembly, are mounted to slide along ways 24 on a rail 20 which is secured to the front of a carriage 21 (Fig. 9). On opposite sides and at opposite ends, the carriage is supported by pivots 22 on elongated shoes 23 which are adapted to slide along temporary guide surfaces 25 formed by solidifying bodies 26 of liquid in the troughs. Preferably, the liquid is water which may be frozen by circulating refrigerant through a coil 28. The guide surfaces 25 are thus formed perfectly level without the necessity of preliminary machining of any of the parts of the bed structure. The shoes 23 and the bodies of ice are maintained at the freezing temperature by circulating refrigerant through coils 27 and 28.

To guide the tool carriage 21 laterally, hardened blocks 29 on arms 30 depending from the rail bear against hardened bars 31 which are supported by fillings 32 of babbit or the like cast into the grooves 10. The fillings are cast while the bars 31 are supported by temporary means with the outer guide surfaces perfectly parallel. These guides also are formed on the bed without the necessity of any machining of the bed castings.

Any suitable tools 33 and 33' may be employed for machining the ways 15 and 16, planer tools being shown herein and mounted on the heads 19. By manipulating suitable screws 34, the tool 33 may be fed along the rail and may be advanced at the proper angle relative to its supporting head. To form the other surface 16, the angle of the feed of the tool 33' is of course reversed. Movement of the carriage 21 back and forth along the bed to machine the ways may be effected by power derived from a reversible motor 35 mounted on the carriage and operable through reduction gearing to drive a drum 36 around which, together with an idler drum 37, a cable 38 is extended with its ends anchored to opposite ends of the bed. After preliminary machining of the ways 15 between the ribs 17 and both of the ways 16, all of the ways are scraped and finished in the usual way.

The table 1 is also of sectional construction and is built up on the bed structure after the latter has been constructed and machined as above described at the final location where the machine tool is to be used. The table is composed of two rows of side sections 40 arranged on opposite sides of a row of intermediate sections 41, the sections of each row being arranged end to end longitudinally of the table and preferably are separated sufficiently (see Figs. 2 and 4) to avoid the necessity of machining the adjacent surfaces of the castings.

The bottoms of the intermediate sections 41 complement the ways 16 and for this purpose are cast with a depending longitudinal rib 42 whose inclined sides are machined accurately to the same V-shape as the ways 16 into which the ribs fit. The sections thus supported are held effectually against lateral displacement during their sliding movement.

Along its outer margin, each side section 40 is supported on one of the bed ways 15 over two flat areas defined by the bottom surfaces 43 of generally circular buttons 44 (Figs. 1 and 2) projecting from the bottom of the section adjacent the outer edges of the latter and mounted on the section for some degree of universal movement whereby to permit the buttons to adapt themselves automatically to the bed ways. Herein the upper portions 45 of the buttons have peripheries machined to a slightly spherical contour and fitting in the internal bore of annular flanges 46 cast on the bottom of the table section. To provide the universal connection, the space between the closed end of the bore and the button is filled with a yieldable or flowable material such as readily pliable synthetic rubber in the form of a layer 47 separated from the button by a thin metal disk 48 that fits closely in the bore. In this way, the weight of each section is sustained by the non-compressible material and is distributed uniformly over the bottom surfaces of the buttons without the necessity of locating the latter accurately by preliminary machining.

Along their inner edges, the side sections 40 are supported by the center sections 41. For this purpose, the upper half portion 50 (Figs. 1 and 5) of the side wall on the section 40 projects beyond the lower portion of this section, and similarly, the lower portion 51 at the side of the center sections 41 projects beyond the upper portion so as to underlie the portions 50. Preferably, the laterally facing surfaces of all four of these portions are machined accurately as to lateral spacing and parallelism so as to fit against each other in abutting edge to edge relation as shown in Fig. 1 and indicated at 50ᵃ. This relation is maintained by upper and lower rows of tie bolts 52 extending transversely through the sections 40 and 41 of the three rows.

The side and center sections are locked together by casting a key 53 (Fig. 7) in spaces formed between squared projections 54 depending from the edge portions 50 of the sections 40 and similar intervening projections 55 upstanding from the underlying portions 51 of the sections 41, each projection on one part being smaller than the notch on the other part into which it projects, thereby forming horizontal and vertical spaces in which horizontal parts 56 and 57 and vertical parts 58 of the key 53 are formed. The latter also includes a part 59 connecting the parts 58 on one side of the key as shown in Fig. 7. Thus, the portions 50 of the sections 40 are supported on the portions 51 of the center sections by the horizontal parts 56 and 57 of the key, while the vertical parts 58 of the key serve to lock the adjacent sections 40 and 41 rigidly against relative longitudinal displacement. The parts 59 hold the sections against any possible relative lateral displacement in the absence of a precise fit between the machined sides of the adjacent sections. Thus, the desired supporting and locking connection may be formed between the adjacent table sections without the necessity of machining the roughly cast surfaces of the interlocking projections 54 and 55 and simply by pouring molten type metal into the space while the sections are held in the proper relationship.

In assembling the table, the central sections 41 are placed on the ways 16 with their ends spaced apart to insure full support of each section solely by these ways. Next, the side sections are placed on the bed with their buttons 44 resting on the surfaces 15. The inner margins of these sections are temporarily supported on the center sections by screws 60 (Figs. 2, 4, 5 and 6) which thread through vertical holes in the overlying portions 50 with their lower ends bearing on the top surfaces of the projections 55. The upper and lower rows of the tie bolts 52 are then extended transversely of the table through the three rows of sections and tightened. The levelling screws 60 are adjusted as may be required in order to permit the machined edge surfaces of the sections to come into full contact as the bolts are finally tightened. Now all of the sections will be fully supported from the ways 15 and 16 and in the exact relation they are to occupy in the final table assembly. After plugging the ends of the spaces between the sections of each row and other points from which liquid might escape, molten type metal is poured into the key spaces filling the same and flowing into all of the other interconnected spaces to form fillings 63 between the sections in each row. The two unitary keys 53 which are thus formed extend throughout the length of the table, and all sections of the three rows become locked together in a manner to resist relative movement between the sections in any direction under applied compressive stresses. The bolts 52 hold the sections against lateral separation.

At their ends, the three rows of sections 40 and 41 are connected by rigid castings 61 extending across the ends and fastened thereto by cap screws 62. To hold the sections of each row against longitudinal separation and provide means by which a driving force may be applied to the table, two pairs of bars 64 (Figs. 1, 2 and 3) extend longitudinally of the table beneath the inner edge portions of the sections 40. At their ends, the bars of each pair are secured by bolts 65 to brackets 66 which abut against the table ends and are bolted. The spaces between the brackets and the table ends are filled with type metal 67 so as to avoid machining of the ends of the table sections. The table constructed as above described constitutes a rigid structure which is slidable along the bed ways with the precision required in present-day machine tools, and this, in spite of the fact that the table is divided both longitudinally and laterally into rows of comparatively small sections which are held together rigidly and accurately with a minimum of preliminary machining. After the table has been built up in this way at the location where the machine tool is to be used, its top surface may be machined to provide a perfectly flat horizontal work supporting surface by using the regular tools of the machine tool. In a similar way the usual T-slots may be formed in the table top.

In view of the substantial size and weight of the table, special means is provided for moving it back and forth along the bed ways. Such drive means constitutes, however, the subject matter of our copending application, Serial No. 503,630, previously noted, of which this present application is a division. Consequently the drive mechanism has not been here shown in detail. For the present suffice it to say that the actuating force for moving the table 1 is applied to the bar 64, thereby pushing instead of pulling the table so as to avoid any tendency to separate the sections. For that purpose the actuating means may comprise two sets of three roller type chains 70 having one of their ends connected by pivot pins 71 to tail pieces 72 projecting from the bracket 66 (Figs. 2 and 3). At the other end of the table, the chain ends are connected to the bracket 66 through the intermediary of adjusting devices designated generally as 73. From these points of anchorage, the chains extend away from the table in one direction, around sprockets 74 (Figs. 2 and 3) then underneath the table and the bed through passages 75 in the foundation, around suitable motor-driven sprockets (not shown) at the other end of the bed, and finally reversely to the second end of the table through the tensioning devices 73. To retain the chains taut the shaft 81 for sprockets 74 (Fig. 3) are journaled in blocks 82 slidable in guides 83 on a base 84 and urged to move in a chain tensioning direction by fluid actuated pistons 85 in cylinders 86 connected to a source of fluid pressure (not shown) by pipes 87.

It will be apparent from the foregoing that the present invention greatly facilitates the construction of machine tools by minimizing the machine work required, and by enabling large size tables and bed structures to be constructed in sections that may be shipped and handled easily and assembled at low cost in the final location where the machine tool is to be used.

We claim as our invention:

1. A machine tool having, in combination, a bed providing an elongated upwardly facing V-shaped guideway along the center thereof, a row of table sections arranged end to end and individually supported in said guideway, parallel guideways on said bed spaced outwardly from said sections, a row of table sections disposed adjacent opposite sides of said row of intermediate sections and individually supported along their inner edges by the intermediate sections, and a pair of members for each of said side sections mounted for some degree of universal movement in the underside thereof and resting on one of said guideways.

2. A machine tool having, in combination, a bed providing an elongated upwardly facing V-shaped guideway along the center thereof, a row of table sections arranged end to end in said guideway, parallel ways on said bed spaced outwardly from said sections, a row of table sections disposed adjacent opposite sides of said row of intermediate sections and individually supported along their inner edges by the intermediate sections, and means slidable along said ways and supporting the outer edge portions of said side sections from said ways.

3. A machine tool having, in combination, rigid table sections arranged edge to edge in adjacent rows, means rigidly connecting the adjacent edges of the sections in the two rows whereby the sections in one row support one edge of the sections in the other row, an elongated bed beneath said sections, a guideway along said bed slidably supporting the opposite edge portions of the sections in said last-mentioned row, and a V-shaped guideway slidably supporting the sections in the other row and holding the sections in both of said rows against displacement laterally of the ways.

LUCIEN I. YEOMANS.
RAYMOND P. FRYE.